US011663658B1

(12) United States Patent
Zoldi et al.

(10) Patent No.: US 11,663,658 B1
(45) Date of Patent: May 30, 2023

(54) ASSESSING THE PRESENCE OF SELECTIVE OMISSION VIA COLLABORATIVE COUNTERFACTUAL INTERVENTIONS

(71) Applicant: FAIR ISAAC CORPORATION, Roseville, MN (US)

(72) Inventors: Scott Zoldi, San Diego, CA (US); Jeremy Mamer Schmitt, Encinitas, CA (US); Maria Edna Derderian, San Diego, CA (US); Jianjun Xie, San Diego, CA (US)

(73) Assignee: Fair Isaac Corporation, Roseville, MN (US)

( * ) Notice: Subject to any disclaimer, the term of this patent is extended or adjusted under 35 U.S.C. 154(b) by 0 days.

(21) Appl. No.: 17/531,709

(22) Filed: Nov. 19, 2021

(51) Int. Cl.
*G06Q 40/02* (2012.01)
*G06F 40/194* (2020.01)

(52) U.S. Cl.
CPC ......... *G06Q 40/025* (2013.01); *G06F 40/194* (2020.01)

(58) Field of Classification Search
None
See application file for complete search history.

(56) References Cited

U.S. PATENT DOCUMENTS

| | | | |
|---|---|---|---|
| 10,373,061 B2 | 8/2019 | Kennel et al. | |
| 11,423,055 B1* | 8/2022 | Gerde | G06N 20/00 |
| 2009/0292568 A1* | 11/2009 | Khosravani | G06Q 40/02 |
| | | | 705/7.28 |
| 2010/0131526 A1* | 5/2010 | Sun | G06F 16/2468 |
| | | | 707/E17.014 |
| 2016/0155136 A1* | 6/2016 | Zhang | G06N 3/0454 |
| | | | 705/7.29 |
| 2017/0206466 A1* | 7/2017 | Zoldi | G06F 3/0485 |
| 2017/0316506 A1* | 11/2017 | Lesner | G06Q 20/102 |
| 2018/0053188 A1* | 2/2018 | Zoldi | G06Q 20/102 |
| 2020/0272853 A1* | 8/2020 | Zoldi | G06F 17/18 |

(Continued)

FOREIGN PATENT DOCUMENTS

WO  WO-2019053632 A1 * 3/2019 ............. G06Q 50/08

OTHER PUBLICATIONS

Wikipedia entry for "Multinomial Distribution". Retrieved from "https://en.wikipedia.org/w/index.php?title=Multinomial_distribution&oldid=1104733560". Aug. 16, 2022. (Year: 2022).*

(Continued)

*Primary Examiner* — Ayal I. Sharon
(74) *Attorney, Agent, or Firm* — Mintz, Levin, Cohn, Ferris, Glovsky and Popeo, P.C.; F. Jason Far-hadian, Esq.

(57) ABSTRACT

Systems, methods, and products for detection of selective omissions in an open data sharing computing platform comprises monitoring a plurality of events associated with a first digital record stored in a database of digital records, the first digital record uniquely identifying a first entity; associating a first detected event with a first set of words at least partially descriptive of the first detected event; associating a second detected event with a second set of words at least partially descriptive of the second detected event, the first event and the second event being detected, in response to digital records associated with the first event and the second event being shared over an open data sharing computing platform with express authorization provided by the first entity.

20 Claims, 6 Drawing Sheets

(56) References Cited

U.S. PATENT DOCUMENTS

2020/0342556 A1* 10/2020 Zoldi ................ G06N 7/005
2021/0004703 A1* 1/2021 Zoldi ................ G06N 5/045

OTHER PUBLICATIONS

Van Dijk et al. "Finding Archetypal Spaces Using Neural Networks". arXiv:1901.09078v2 [cs.LG] Nov. 13, 2019. (Year: 2019).*

Irene Epifanio et al. "Archetypal Analysis With Missing Data: See All Samples by Looking at a Few Based on Extreme Profiles". The American Statistician. vol. 74, 2020—Issue 2. pp. 169-183. Published online: May 13, 2019. (Year: 2019).*

Jesús Moliner & Irene Epifanio. "Bivariate Functional Archetypoid Analysis: An Application to Financial Time Series" Chapter in "Mathematical and Statistical Methods for Actuarial Sciences and Finance", pp. 473-476. First Published Online: Jul. 18, 2018 (Year: 2018).*

* cited by examiner

ASSESSING THE PRESENCE OF SELECTIVE OMISSION VIA COLLABORATIVE COUNTERFACTUAL INTERVENTIONS

TECHNICAL FIELD

This disclosure relates generally to the detection of selective omissions in an open data sharing environment and more particularly to trainable intelligent special-purpose computing systems and machines that can detect the probability of a selective omission in customer-provided payment transaction data.

BACKGROUND

Artificial intelligence (AI) systems and models are highly data driven electronically developed architectures that are typically implemented using machine learning. A machine learning model is created based on learning the mathematical representation of relationships that exist within a training dataset. The model, based on earlier training, yields classification outcomes in response to data fed to the model. Training an AI system involves providing input data to the model and adjusting predictive features and model weights in the model's representative mathematical formula with the intention to improve the model's prediction accuracy.

AI systems are in use in many electronically implemented financial and transaction-based systems with practical applications for detecting suspect transactions. AI systems and models help improve both the efficiency and speed of the functional and analytic aspects far beyond what a human operator is able to achieve, using human cognitive abilities or pure mental processes. Undisputedly, the practical use and application of AI models has immensely contributed to improvements over the conventional fraud detection technology and continues to increase and enhance productivity and usefulness of new data driven electronic platforms and architectures.

Open banking is a type of electronically implemented data sharing environment and platform in which individual participants (e.g., customers, credit applicants, or consumers) provide permission to share financial account data over communications networks, typically in an encrypted or otherwise secured setting. The shared data is made accessible to creditors or other providers in an effort to qualify the participants to obtain or purchase goods and services. Open banking has been actively adopted by major financial markets throughout the developed world, such as Europe, and is gaining momentum in developing markets.

The premise of open banking is built upon trust in secure data sharing among authorized users and the increased awareness of expressed customer consent in sharing data. This has provided for unique new ecosystems for services outside traditional banking silos. Open banking can be enabled through standards that prescribe how customer financial information is shared securely with third parties who offer goods and services predicated on the receipt of customer consent and the analysis of the related transactions and account data.

Regardless of the open banking standards or features used, sharing of financial account data is done upon customers' express approval, only. Therefore, there may be instances when customers may decline or fail to share a selected portion of their account information and payment transaction data. Omissions in sharing certain data may be intentional to manipulate a perceived or computed customer creditworthiness, or due to unintentional errors in transmission.

For example, a customer who exhibits a poor credit history for an existing line of credit may choose not to share transaction data from that line of credit, skewing the true risk profile of the customer. Particularly, if the customer has a better credit history in other lines of credit, limiting the shared data to accounts that portray the customer in a better light will have a net effect of improperly exaggerating an applicant's creditworthiness.

The current technical deficiencies in detecting such manipulations results in errors and the inefficient use of resources in the financial analytics computing platforms and architectures. It is desirable to detect, eliminate, or at least reduce the possibilities of improper manipulations in an open banking environment based on the technical advancements and improved system architectures disclosed herein below.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one or more implementations, artificial intelligence driven systems and methods for reducing and eliminating inefficiencies and possibilities for error in analytic computing platforms are provided. Particularly, in an open banking environment, where a consumer shares financial information with authorized parties, it is important to detect selective omission of information. The collective analysis of transaction information provides clues or inferences of omission, if certain information is missing.

To detect the customer applications that may be suspected of omitting certain accounts or information, a customer's financial transactions and accounts (and related events) may be monitored and mapped to certain terms (e.g., words). The identified terminology (e.g., a set of words) may be assigned to a particular record (e.g., a document) associated with the customer. A trained intelligence computing model may detect anomalies based on a collaborative counterfactual analysis of customer records.

In particular, as transaction data is monitored and the set of words are associated with the transactions, changes in the set of words overtime is detected to determine if the collection of words associated with a customer record has changed enough, overtime, to indicate a change of behavior or anomaly. A creditworthiness evaluation (e.g., a credit score) may be then determined for the consumer according to whether the changes are explainable and consistent in view of certain constraints, thresholds, or rules.

In certain embodiments, two separate scores may be generated. A primary score may provide a general indication of credit risk, and a non-primary score may provide an indication or warning that some information may be missing (e.g., an alert about the likelihood of an account omission by a customer). In some implementations, it is also possibly to provide clues or an understanding of the nature of the information that may have been omitted (e.g., the omission of a certain customer credit line or account).

In one aspect, a computer-implemented method for detection of selective omissions in an open data sharing computing platform comprises monitoring a plurality of events associated with a first digital record stored in a database of digital records, the first digital record uniquely identifying a first entity; associating a first detected event with a first set of words at least partially descriptive of the first detected event; associating a second detected event with a second set of words at least partially descriptive of the second detected event, the first event and the second event being detected, in response to digital records associated with the first event and the second event being shared over an open data sharing computing platform with express authorization provided by the first entity; establishing a digital association between a first digital document assigned to the first entity and a third set of words, the third set of words being a union of the first set of words and the second set of words and implemented by way of creating a digital set of unordered records from a combination of the words in the first set of words and the second set of words; and determining the first entity's multinomial distribution over a plurality of archetypes, wherein a probability of the first entity belonging to each archetype from among the plurality of archetypes is calculated based on the words included in the digital set of unordered records.

An omission is deemed probable as related to the first entity, in response to determining that the first entity belongs to a distribution of archetype probabilities and that an account type associated with the distribution of archetype probabilities is likely not included in a list of accounts or events shared by the first entity over the open data sharing computing platform. A subsequent event is associated with subsequent words of at least partially descriptive subsequent event a new digital association is established between the first digital document assigned to the first entity and a union of subsequent set of words with a prior history of word events, and wherein the multinomial distribution of the plurality of archetypes is denoted by a vector $\theta \in [0,1]^m$, where m denotes number of the plurality of archetypes, and where a $j^{th}$ entry, $\theta_j$, represents the probability of the $j^{th}$ archetype for the first entity.

In one embodiment, a matrix $\phi \in [0,1]^{n \times m}$ is defined by the relation, $\phi_{ij}=P_j(w_i)$, indicating that a digital record referenced by the $i^{th}$ row and $j^{th}$ column in the matrix represents the probability of word i under the distribution corresponding to archetype j. The first entity is associated with a distribution over words in the digital set of unordered records, and wherein the distribution is used to determine a probability of a given word being associated with the first entity and an archetype mixture as denoted by $P_\theta(w_i)=\Sigma_j \phi_{ij} \theta_j$. A digital collaborative profile for the first entity is generated to store the values of $\theta$, and the collaborative profile is updated, in response to detecting an event associated with a first digital record. Based on the collaborative profile, the first entity is embedded as an m-dimensional vector in archetype space, $\theta \in \mathbb{R}^m$.

The first entity may be compared with other entities generated through a counterfactual intervention of entities with omitted account or tradeline events in the archetype space to detect likelihood of selective omissions by the first entity. In one embodiment, the first entity is compared with other entities generated through a counterfactual intervention of entities with omitted account or tradeline events in the archetype space and use of a trained supervised model on actual and generated through a counterfactual intervention of entities with omitted account or tradeline events to determine the probability of the type of accounts omitted by the first entity.

In one implementation, the first entity is an individual submitting a credit application and the individual is associated with a primary score, indicating the individual's credit worthiness, and a supplemental score generated based on the likelihood of selective omissions by the individual participating in the open data sharing environment and identification of type of omitted data.

Implementations of the current subject matter may include, without limitation, systems and methods consistent with the above methodology and processes, including one or more features and articles that comprise a tangibly embodied machine or computer-readable medium operable to cause one or more machines (e.g., computers, processors, etc.) to result in operations disclosed herein, by way of, for example, logic code or one or more computing programs that cause one or more processors to perform one or more of the disclosed operations or functionalities. The machines may exchange data, commands or other instructions via one or more connections, including but not limited to a connection over a network.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

The figures may not be to scale in absolute or comparative terms and are intended to be exemplary. The relative placement of features and elements may have been modified for the purpose of illustrative clarity. Where practical, the same or similar reference numbers denote the same or similar or equivalent structures, features, aspects, or elements, in accordance with one or more embodiments.

DETAILED DESCRIPTION OF EXAMPLE EMBODIMENTS

In the following, numerous specific details are set forth to provide a thorough description of various embodiments.

Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
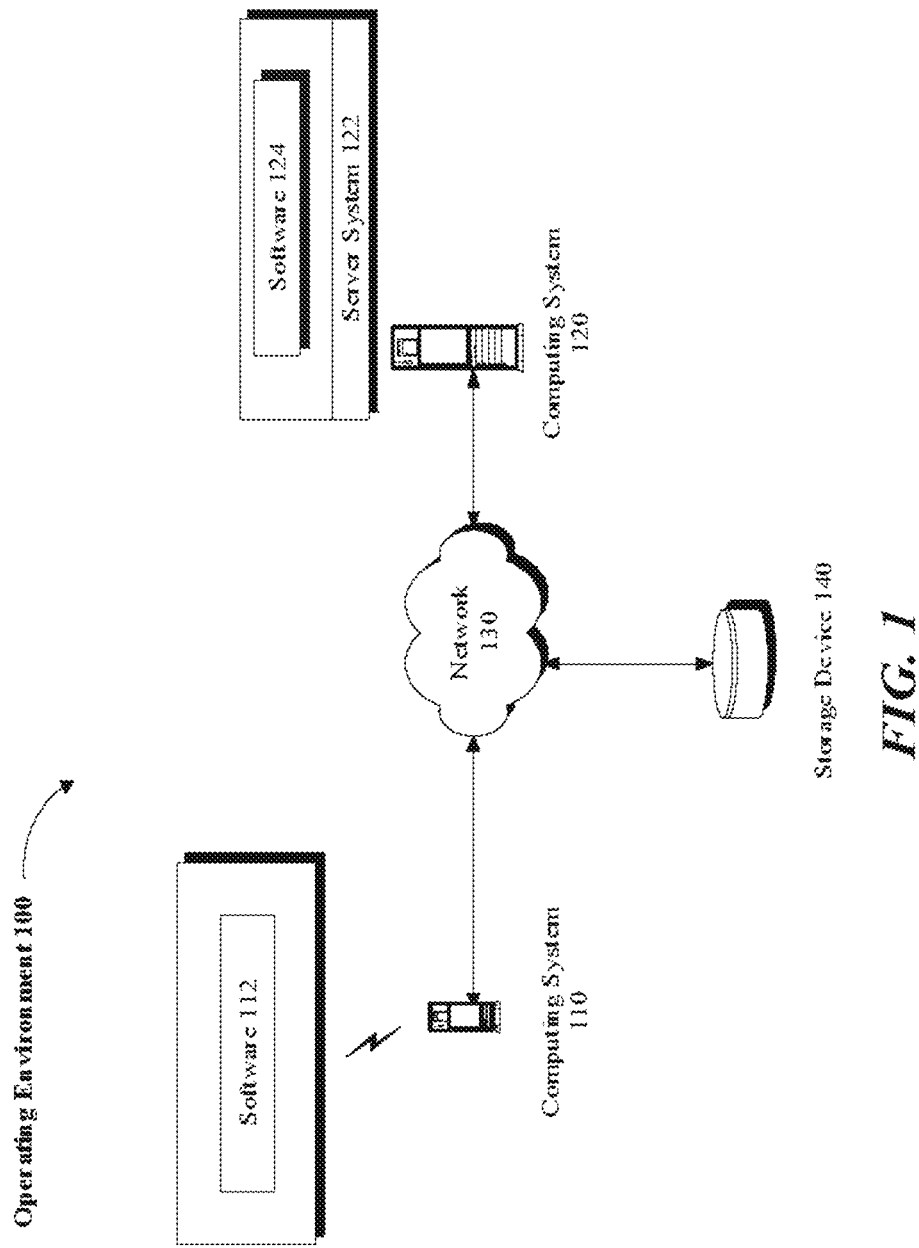
FIG. 1 is an example an operating environment over which an open data sharing platform may be implemented, in accordance with one embodiment.

Referring to FIG. 1, an example operating environment 100 is illustrated in which a computing system 110 may be used by a customer to interact with software 112 being executed on computing system 110. The computing system 110 may be a general purpose computer, a handheld mobile device (e.g., a smart phone), a tablet, or other communication capable computing device. Software 112 may be a web browser, a dedicated app or other type of software application running either fully or partially on computing system 110 that would allow the customer to participate in an open banking environment to selectively share information about the customer's financial history and accounts.

Computing system 110 may communicate over a network 130 to access data stored on storage device 140 or to access services provided by a computing system 120 (e.g., a service provider). Depending on implementation, storage device 140 may be local to, remote to, or embedded in one or more of computing systems 110 or 120. A server system 122 may be in communication with or configured on computing system 120 to implement an open banking platform capable of servicing one or more requests submitted by one or more customers using computing system 110 or software 112 (e.g., client systems) via network 130. Network 130 may be implemented over a local or wide area network (e.g., the Internet).

Open banking computing system 120 and server system 122 may be implemented over a centralized or distributed (e.g., cloud-based) computing environment as dedicated resources or may be configured as virtual machines that define shared processing or storage resources. In certain implementations, an electronic ledger (e.g., a blockchain) system may be utilized for the immutable recordation of data and related activities performed in the open banking environment. The Execution, implementation or instantiation of software 124, or the related features and components (e.g., software objects), over server system 122 may also define a special purpose machine that provides remotely situated client systems with access to a variety of data and services.

Figure 2:
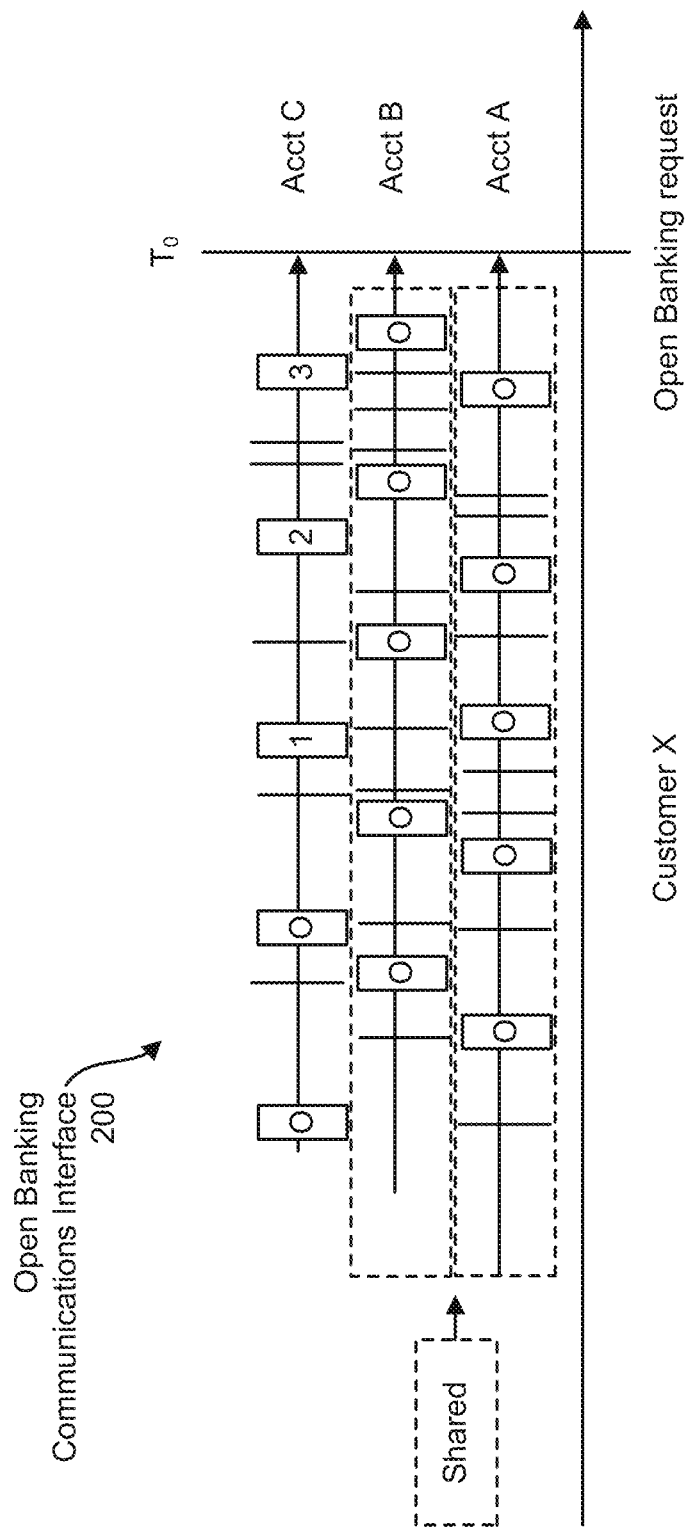
FIG. 2 is an example of an open banking communications interface, in accordance with one embodiment.

In accordance with one aspect, a customer may interact with computing system 110 and utilize software 112 to allow a service provider (e.g., a third party) to collect account and transaction historical data for the customer within the open banking environment illustrated in FIGS. 1 and 2. Based on this historical data, the service provider may determine the creditworthiness of the customer. For customers that elect not to share poor performing lines of credit, the service provider determines transaction histories that show definitive characteristics of selective omissions.

Selective omission in certain scenarios occurs because the sharing of specific financial account data is such that each tradeline requires the customer's specific approval. Selective omission bears a resemblance to selective bias which generally occurs when people have the ability to volunteer to share data about themselves. Those who choose to join, that is, who self-select into the study, may share a characteristic that makes them different from non-participants from the start. In open banking, the financial account information that the customer selectively allows a bank to share with third parties can reveal common characteristics for customers who selectively disallowed key payment data from being shared.

As provided in detail herein, AI-based detection technologies and systems may be effectively trained to identify characteristics of selection bias in shared data. The shared data may be aggregated from an open banking environment and the non-random missing data due to selective omission can be modeled and considered analytically when making predictions of the creditworthiness of the customer. As such, customers that choose to introduce selection bias to manipulate a credit decision may be identified though specialized models that notify service providers and creditors of potential selection or omission bias.

Referring to FIG. 2, an example open banking communications interface 200 is illustrated, where a Customer X has three accounts, but opts to share only the information from the first two accounts A and B when submitting a credit application, for example. As shown, the customer's account status at each cycle is labeled as 0, 1, 2 and 3. In this example, 0 means current and 1, 2, 3 refer to 1 cycle, 2 cycles and 3 cycles delinquent, respectively. Account A and Account B are in current status. Account C is 3 cycles delinquent.

At time $T_0$, Customer X has an open banking request to disclose all accounts for a new account origination. To avoid negative impact on the submitted credit application, customer X has only selected account A and account B for disclosure through open banking. The selective omission of the third account removes a tradeline C associated with the customer. Comparing Customer X with other customers, using AI analytics can provide an estimate of the probability that Customer X has a missing account.

Denoting $CUST_{NO\_OMISSION}$ to be the population of customers with no omitted tradelines, $CUST_{OMISSION}$ represents the population of customers with at least one tradeline selectively omitted. A systematic bias is demonstrated in the selection of tradelines that are omitted. With this view, a method to generate synthetic examples of selective omission in the case of unlabeled data is provided. In one example, the tradelines with the highest delinquency rate or low payment to balance ratios or those that have extreme utilization as a ratio of credit on the tradeline are excluded. A predictive model will compute the probability that the customer belongs to a class of $CUST_{OMISSION}$ or $CUST_{NO\_OMISSION}$, thus providing an indication of whether the customer is likely to have missing tradelines.

The methodology for determining the probability of class may be accomplished through the use of a specialized collaborative filtering or collaborative profiling, which is used to find archetypes of historical behavior. These archetype mixes can be used as a soft-clustering for outlier detection. The detection may be based on an automated method of learning archetypes which capture many aspects of entity behavior and assigning individual entities to a mixture of archetypes, such that an entity is represented as a soft clustering across multiple archetypes. Given those representations in archetypes, anomalous behavior can be detected by finding misalignment with the dominant archetype clustering densities.

Applications of this method include anti-money laundering (e.g., where the entities can be customers and accounts), retail banking fraud detection, network security, and general anomaly detection. In the following, the terms "document" or "documents" may refer to a profiled entity (e.g., a target customer) and the terms "word" or "words" may define events observed in the financial transaction data stream (e.g., a simple merchant category code or a transfer of between $45-$230 to Kazakhstan) and the terms "topic" or "topics" may refer to latent entity behavior archetypes defined by a distribution over these defined events or words.

The customer document in one example may be a set of tokens (defined events/words) described by a space of defined financial events involving the entity being profiled, which yields a bag of words associated with the customer that describes their financial history with customer submitted previous tradelines. Through a Bayesian learned Latent Dirichlet Allocation words are associated with topics/archetypes and different customers are mapped to different loadings on the behavioral archetypes in real time.

The archetypes are not conceptual custom categories. Rather they are machine-learned by an algorithm that analyzes historical transactional data based on a collected set of words, sometimes referred to as a "bag of words," associated with a large corpus of customers. With a customer's archetype loadings available, a customer-specific probability distribution over words is obtained, which provides a probability of occurrence even for words that have not been seen in the customer's financial history. This advantageously leads to determination of likelihood of seeing missing words associated with non-consented and omitted financial transaction history.

In one implementation, selective omission translates to "words" which are missing (e.g., missing negative cycle information from missing tradeline). Using the customer account data, the AI-enable technology predicts a given customer's archetype and determines if it is probabilistically more similar to normal customers in the $CUST_{NO\_OMMISION}$ population or is it probabilistically more similar to the $CUST_{OMISSION}$ population of customers with missing tradelines.

Figure 3:
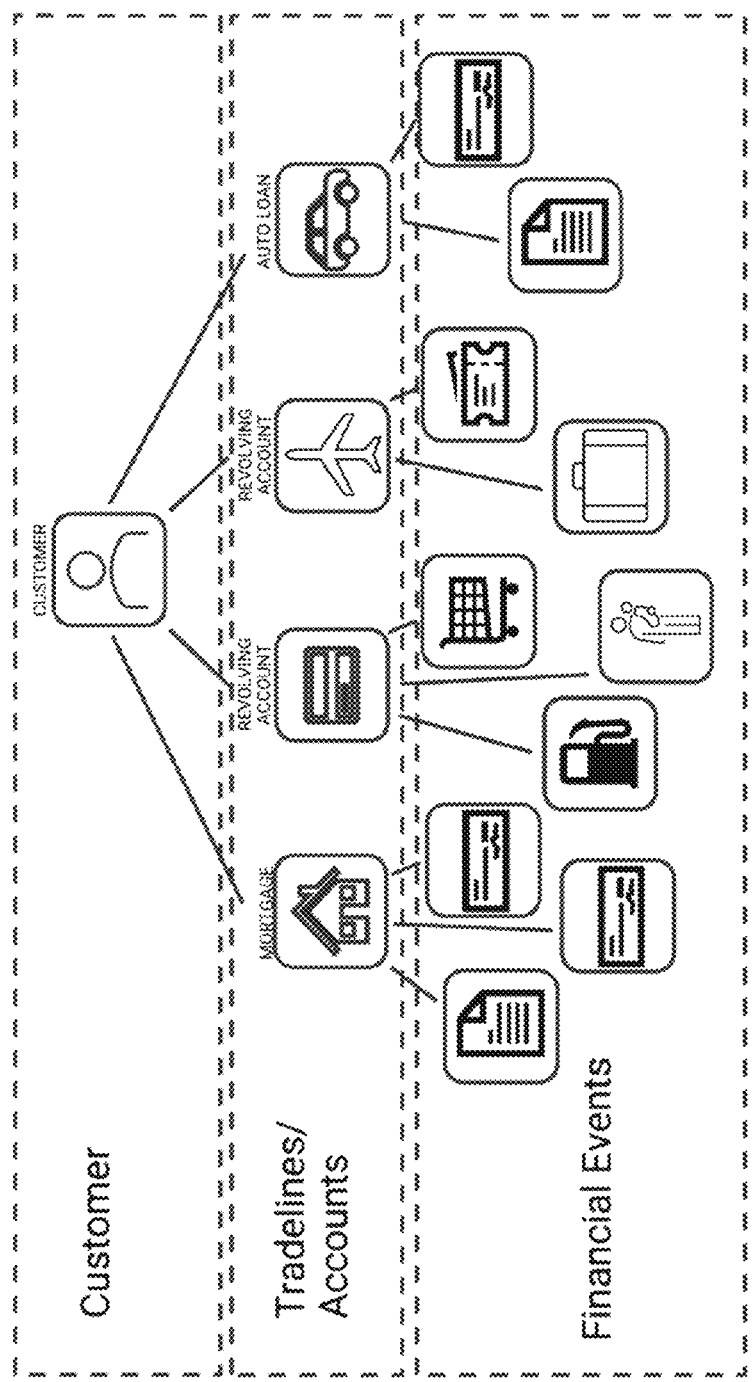
FIGS. 3 and 4 are illustrations of example hierarchical relationships between artifacts that can be monitored or inferred by way of collaborative analysis in an open banking architecture, in accordance with one or more aspects.
Figure 4:
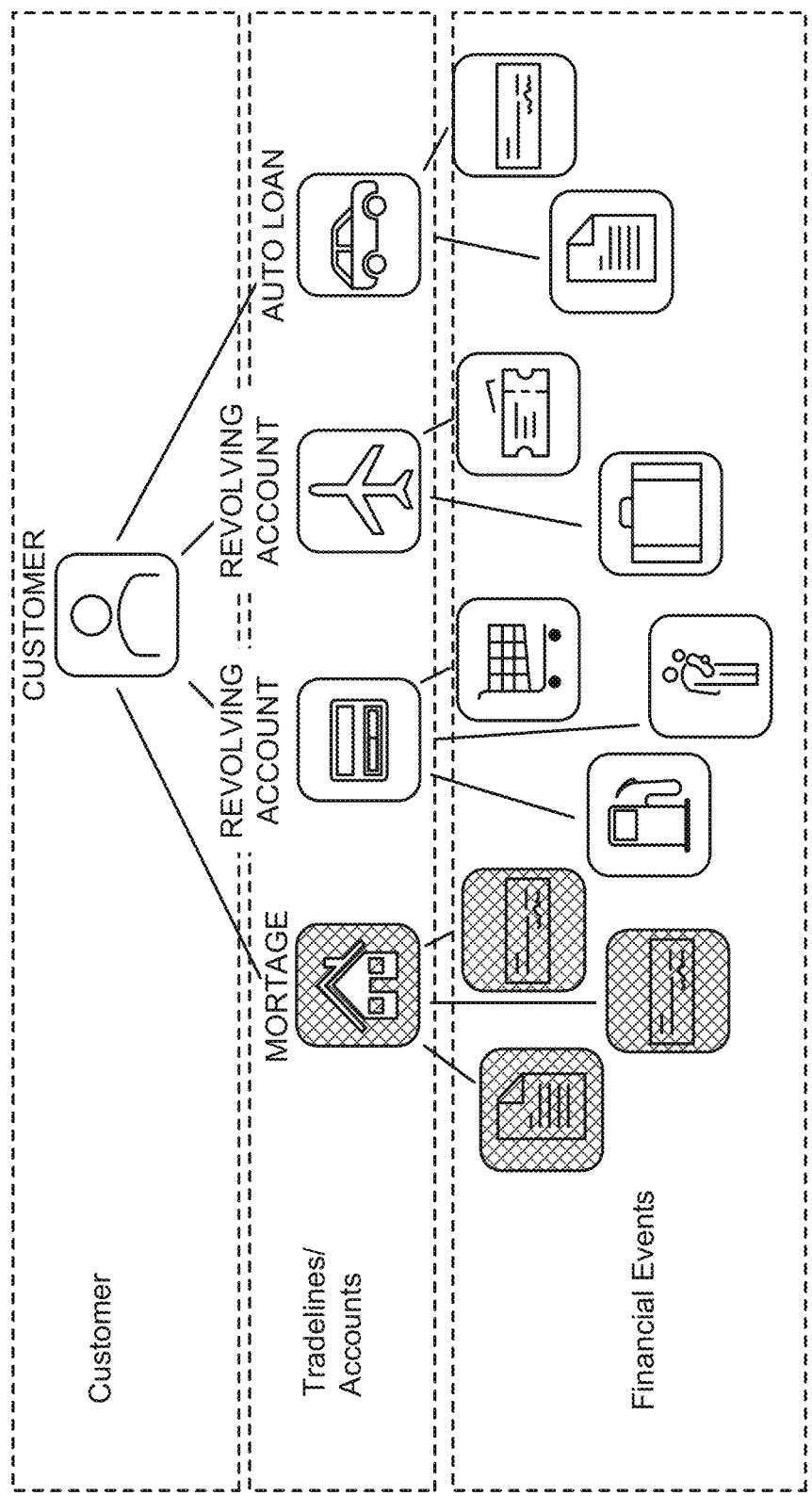

Referring to FIGS. 3 and 4, relations between a customer, accounts/tradelines, and associated financial events are illustrated. As shown, a customer is associated with one or more tradelines/accounts and each tradeline/account is associated with financial events. In FIG. 3, no accounts/tradelines were omitted. In FIG. 4, however, a mortgage account was omitted implying that the customer's document will be missing the words directly indicating a mortgage account.

Financial events can be mapped to one or more words that populate a customer's document. A customer-level document may be populated with words based on tradeline/account financial events. In accordance with one or more implementations, selective omissions may be detected by estimating the likelihood or count of omissions that may have occurred. Assuming that there are a fixed number of tradeline categories and each customer's data is composed of one or more instances from one or more tradeline categories, the likelihood that at least one instance of a particular tradeline category was omitted may be estimated. In some aspects, the number of omitted instances of a particular tradeline category may be also estimated.

Consider an example scenario in which Customer W disclosed only two revolving credit card accounts A and B, but did not disclose two other credit card accounts C and D. Using AI-implemented technology disclosed herein, the probability that at least one instance of a credit card account was omitted or an estimate of how many credit card accounts were omitted can be provided by estimating probabilities of at least one instance of tradeline category omission and tradeline instance omissions, where a customer's data will represent a collection of financial transaction events, and each transaction event can be mapped into one or more words.

Figure 5:
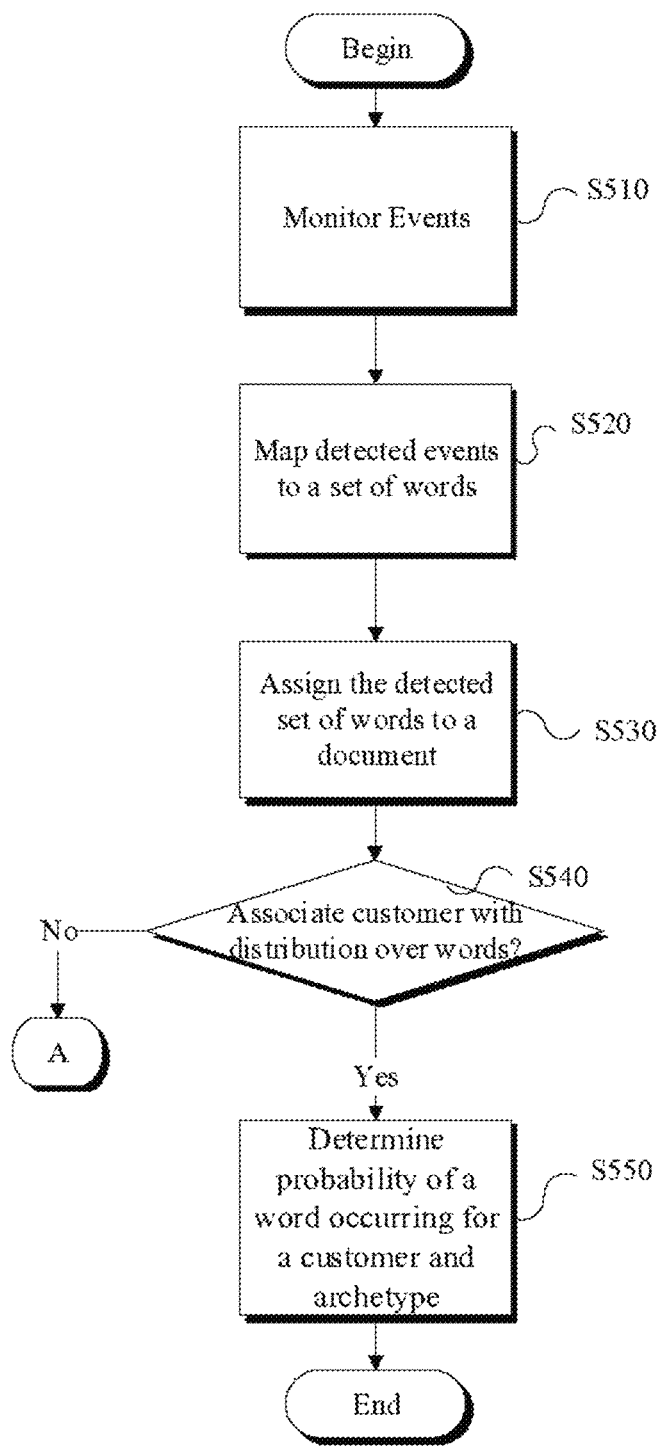
FIG. 5 illustrates a process flow, in accordance with an example embodiment, for detection of selective omissions by way of assigning to a customer a set of words associated with detected transactions.

Referring to FIG. 5, in certain embodiments, customer-related financial events are monitored (S510). When financial events are detected, the financial events are mapped to a set of words (S520). For example, if a customer opens a credit card account, this first event can be mapped to one or more words representing origination of a credit card account. If the customer makes a mortgage payment on their home loan, then this second event can be mapped to, for example, two corresponding words—one that indicates whether the payment was delinquent or not, and another word that indicates the amount of the mortgage payment. In this example, a word represents aspects of a discrete financial event, where an archetype is defined as a multinomial probability distribution over words, and a customer is associated with a multinomial distribution over archetypes.

In probability theory, the multinomial distribution is a generalization of the binomial distribution. For example, it models the probability of counts of instances for each side of a k-sided die rolled n times. For n independent trials each of which leads to a success for exactly one of k categories, with each category having a given fixed success probability, the multinomial distribution gives the probability of any particular combination of numbers of successes for the various categories.

Referring back to FIG. 5, In order to provide a view to a customer's financial history as an unordered set of words (i.e., the bag of words), the detected set of words is assigned to a customer's document (S530). If $W^{(j)}$ represents the set of words in customer j's document, the set of all possible words as a discrete and finite set may be denoted by $W=\{w_i\}_{i=1}^{n}$. A customer's multinomial distribution over archetypes is denoted by the vector $\theta \in [0,1]^m$, where m denotes the number of archetypes and the $j^{th}$ entry, $\theta_j$, represents the probability of the $j^{th}$ archetype given the customer. The matrix $\phi \in [0,1]^{n \times m}$, may be defined by the relation, $\phi_{ij}=P_j(w_i)$, implying that the $i^{th}$ row and $j^{th}$ column represents the probability of word i under the distribution corresponding to archetype j.

Accordingly, it is determined whether a customer can be associated with a distribution over words (S540). If so, the distribution may be used to determine the probability of a given word occurring for the particular customer and the associated archetype mixture as denoted by $P_\theta(w_i)=\Sigma_j \phi_{ij} \theta_j$ (S550). A customer's collaborative profile stores the values of $\theta$, and it is updated each time a relevant financial event occurs for the customer. As such, using collaborative profiling, a customer may be embedded as an m-dimensional vector in archetype space, $\theta \in \mathbb{R}^m$. In this space, customers can be compared with the goal of detecting selective omission as distinct customer behaviors that will separate customers that provide full transaction history versus those selectively omitting tradeline data, and in particular likely bad trade line data.

In one embodiment, each word may correspond to exactly one tradeline category. The number of tradeline categories is finite, so each tradeline is uniquely identified by some positive integer $i \in \mathbb{Z}^+$ and a tradeline category i as $t_1$, the number of instances of $t_i$ for customer j as $T_i^{(j)}$. For the function $f_T:W \rightarrow \mathbb{Z}^+$, $f_T(w)=i$ implies that word w corresponds to tradeline category i. The set of all words corresponding to tradeline category i, may be represented as $W_{t_i}:=\{w \in W | f_T(w)=i\}$. Additionally, for each customer j, a function $g_j:W \rightarrow \mathbb{Z}^{+,0}$ is defined that maps a given word to the count of occurrence(s) of the word in the customer's document.

Based on the above, the probability of customer j having no instances of tradeline category i denoted by $t_i$ may be defined by:

$$P(T_i^{(j)} = 0) = P\left(\bigcap_{w \in W_{t_i}} g_j(w) = 0\right).$$

Conversely the probability of customer j having at least one instance of tradeline i may be defined by:

$$P(T_i^{(j)} > 0) = 1 - P\left(\bigcap_{w \in W_{t_i}} g_j(w) = 0\right).$$

As a shorthand for the above probability one can denote $P(T_i^{(j)}>0)$ as $P(t_i)$, where the customer j will either be a general individual customer or made clear within the context of reference. The occurrences of words from the same tradeline category will likely not be independent, and the above equation can quickly become intractable as the cardinality of $W_{t_i}$ increases. In the case of only one unique word associated with $t_i$, i.e., $W_{t_i}=\{w\}$, the above equation can be simplified to, $P(t_i)=1-(1-P_\theta(w))^M$, where M is the number of words in the customer's document.

The above may not provide an ideal result as this would imply that for customers with large M even rare tradelines will appear to be likely. This is driven by the disparity in the word density of different tradelines in the bag of words, making a prediction of a tradeline missing difficult when not accounting for word volume differences of different tradelines accounted for in further detail below.

In certain embodiments, a disconnect arising from multinomial probabilistic modelling assumptions of a Latent Dirichlet Allocation (LDA) may not be the best fit when it comes to predicting instances of tradelines versus counts of words, and these assumptions can lead to biased estimates dependent upon average tradeline category word count or the number of words in a customer's document. While the LDA model alone may be insufficient for estimating $P(t_i)$ directly, the resulting customer archetype embeddings are what can be leveraged to detect selective omission as provided in further detail herein and below.

In one embodiment, an unsupervised method to detect selective omission is implemented. Note that $$P(T_i^{(j)} > 0) = \mathbb{E}\left[1_{\{T_i^{(j)}>0\}}\right],$$

where $$1_{\{T_i^{(j)}>0\}}$$

is the indicator function of the event $T_i^{(j)}>0$ occurring, which takes a value of 1 if the event occurred and 0 otherwise, where E is the expectation operator. Then in the case of estimating the likelihood of omission of at least one instance of a tradeline i tradeline category, we are interested in estimating $$\mathbb{E}\left[1_{\{T_i^{(j)}>0\}}\right],$$

while in the case of predicting the number of instances omitted we are interested in estimating $$\mathbb{E}[T_i^{(j)}],$$

so in either case an estimation of expected value is to be determined. Without loss of generality, the following provides a method for detecting categorical omission via multiclass classification. It is noted, however, that a similar process can be applied to cover the case of instance omission via regression. The method provided is not dependent upon having tagged data that indicates whether a given customer committed selective omission, and in this sense, it is an unsupervised method, but it will leverage the power of modern supervised algorithms by generating synthetic examples and tags.

As an example, consider the following set of customers and their associated tradelines. Customer X has instances of tradelines A, B, and C, Customer Y has instances of tradelines A, B, and D, while Customer Z has instances of tradelines A and B. It is desirable to know whether Customer Z has omitted tradelines of category C or D. For each customer, their respective archetype is obtained embedding via collaborative profiling yielding $\theta_X$, $\theta_Y$, $\theta_Z$.

To see if Customer Z may have omitted tradeline C, it seems reasonable to compare him to Customer X by removing instances of tradeline C from Customer X and constructing the resulting perturbed archetype embedding $\hat{\theta}_X$. If $\theta_Z$ is similar to $\theta_X$, then this would provide evidence of Customer Z selectively omitting tradeline C. Similarly, we can gather evidence of Customer Z omitting tradeline D by comparing $\theta_Z$ to how Customer Y's archetype embedding would appear had they omitted tradeline D by constructing perturbed archetype embedding $\hat{\theta}_Y$. In essence, a counterfactual is constructed by modifying a customer's tradeline data and calculating the resulting perturbed archetype embedding.

The set of customer documents may be denoted as $\{W^{(j)}\}_{j=1}^N$ and the associated customer archetype embedding as $\{\theta^{(j)}\}_{j=1}^N$. Each customer is associated with a tag vector yielding a set of vectors $\{t^{(j)}\}_{j=1}^N$ where $t_i^{(j)}:=1$ if Customer j omitted at least one instance of tradeline i, and 0 otherwise. To obtain a set of perturbed customers missing an instance of tradeline k, we will omit the set of words associated with an instance of tradeline k from each customer's document to obtain the perturbed set of documents $$\{\vec{W^{(j)k}}\}_{j=1}^N.$$

Then the associated resulting perturbed archetype embeddings can be calculated via collaborative profiling to obtain $$\{\vec{\theta^{(j)k}}\}_{j=1}^N,$$

and we create the associated tag vectors $$\{\vec{t^{(j)k}}\}_{j=1}^N,$$

where $$\overrightarrow{t_k^{(i)}} = 1 \text{ for all } j.$$

This perturbation process is repeated for each category of tradeline to yield a combined set of data $$\{\theta^{(j)k}\}_{j=1}^{N} \bigcup \bigcup_{k=1}^{K} \{\overrightarrow{q^{(j)k}}\}_{j=1}^{N}$$

along with the corresponding set of tag vectors $$\{t^{(j)k}\}_{j=1}^{N} \bigcup \bigcup_{k=1}^{K} \{\overrightarrow{t^{(j)k}}\}_{j=1}^{N}.$$

Together the above two sets may be referred to as the training data, and the size of the training data will grow linearly depending upon the number of distinct tradeline categories. Note that within each category of tradeline it may be desirable to have a further breakdown into sub-categories of tradelines, i.e., credit card accounts could be further categorized as gas cards, retail store cards, airline cards, or general consumer. In this case the data perturbation process described above could be further refined to remove a particular sub-category instance by removing words from a customer's document coming from a tradeline instance of the respective sub-category. Other modifications to this process can be considered based on the particular context and domain from which the data originated.

Once the training data has been generated, a supervised multi-class classification algorithm can be trained to estimate the probability of selective omission of a tradeline instance for each category of tradeline. Many different supervised classification algorithms could be considered here including but not limited to logistic regression, artificial neural networks, or decision tree models. In production, a customer's document will be constructed based upon their incoming data record, and their archetype embedding will be calculated via collaborative profiling. The archetype embedding vector will then be input into the trained classification model to return a vector of tradeline category instance omission probabilities, which can then be leveraged in the decision process to guide further inquiry if the probabilities are sufficiently large.

In certain embodiments, the method could be modified to return a single probability of selective omission by framing it as a binary classification problem where 1 denotes that at least one instance of tradeline omission from some category has occurred and 0 implies that no instances of selective omission occurred. The input features could be further enhanced to not only include the values of the archetype embedding vector, but also additional features associated with the client's data. The absence or presence of some words could be of particular importance depending upon the domain and context.

For example, if a word was associated with default or late payment, it could be used directly as an input feature by forming an indicator variable or calculating information-theoretic values such as surprise or other possible feature engineering. Additional modifications and additions are possible to implement a trained classification model that returns a probability of instance omission for each category of tradeline, with a classification engine being the augmented training data set created using collaborative counterfactual interventions, yielding a potent weapon in the fight to detect selective omission.

Expository Example:

The following is an illustrative example provided for a better understanding of the detailed embodiments, but without limiting the general scope of the disclosure subject matter to the specific illustrative details. The example is based on a data set of approximately 10,000 customers each with around 30 to 200 financial events or transactions corresponding to their accounts or tradelines, where customers averaged around 3 tradelines each.

Words were created by mapping each financial event into a corresponding transaction type word yielding a total of 35 unique words. The number of occurrences of each word was counted for each customer. Table 1 below provides an example of the words counts for a particular customer, Customer X

| CUSTOMER X | | | | | | | |
| --- | --- | --- | --- | --- | --- | --- | --- |
| Mortgage | | Revolving Account | | Debit Account | | Auto Loan | |
| WORD | COUNT | WORD | COUNT | WORD | COUNT | WORD | COUNT |
| Mortgage Payment | 18 | Fuel | 8 | Water | 12 | Auto Loan Payment | 9 |
| | | Mechanic | 7 | Energy | 11 | | |
| | | Groceries | 1 | Cash Withdrawal | 5 | | |
| | | Home Repairs | 11 | Health Insurance | 2 | | |
| | | | | Cash Deposits | 9 | | |
| | | Childcare | 4 | Home | 3 | | |
| | | Car parks | 3 | Communications | | | |
| | | Beauty | 1 | Credit Card | 3 | | |
| | | Health | 5 | Bank Transfers | 4 | | |
| | | Food | 1 | Council Tax | 1 | | |
| | | Road Tax | 4 | Income Support | 1 | | |
| | | Gambling | 1 | | | | |
| | | Taxi | 1 | | | | |
| | | Other Exp | 1 | | | | |
| | | Pet Care | 1 | | | | |

In table 1, only the non-zero word counts are shown for Customer X, which mirrors the form of the sparse data structures that are used to hold the word counts across all customers. Counterfactual interventions were then applied to create new customers by removing a tradeline instance from each customer and repeating for different tradeline instances. This resulted in a combined set of nearly 50,000 customers both perturbed and original. As an example, consider a counterfactual intervention applied to Customer X, whereby the mortgage account and associated words were removed to create a new synthetic Customer $\hat{X}$, as shown in Table 2.

TABLE 2

CUSTOMER $\hat{X}$

| Revolving Account | | Debit Account | | Auto Loan | |
|---|---|---|---|---|---|
| WORD | COUNT | WORD | COUNT | WORD | COUNT |
| Fuel | 8 | Water | 12 | Auto Loan | 9 |
| Mechanics | 7 | Energy | 11 | Payment | |
| Groceries | 1 | Cash Withdrawal | 5 | | |
| Home Repairs | 11 | Health Insurance | 2 | | |
| | | Cash Deposits | 9 | | |
| Childcare | 4 | Home | 3 | | |
| Car parks | 3 | Communications | | | |
| Beauty | 1 | Credit Card | 3 | | |
| Health | 5 | Bank Transfers | 4 | | |
| Food | 1 | Council Tax | 1 | | |
| Road Tax | 4 | Income Support | 1 | | |
| Gambling | 1 | | | | |
| Taxi | 1 | | | | |
| Other Exp | 1 | | | | |
| Pet Care | 1 | | | | |

Next, a collaborative profiling model was trained using the customer-level word counts as input and setting the number of archetypes/topics to 12. The output included two 2-d arrays. The first 2-d array consists of the $\theta$'s for each customer in the corpus. Recall that a customer's archetype embedding vector, $\theta$, is a vector representing the multinomial distribution over archetypes for that customer. The second 2-d array is the matrix where each column represents a multinomial distribution over words for a particular archetype. Using the matrix we can examine the top 5 most probable words for each archetype, which is shown in Table 3.

TABLE 3

Archetypes Top 5 Most Probable Words

| Archetype 1 (Homeowner A) | | Archetype 2 (Car Owner A) | |
|---|---|---|---|
| Probability | Word | Probability | Word |
| 0.2067 | HOME REPAIRS | 0.3490 | AUTO LOAN PAYMENT |
| 0.1064 | WATER | | |
| 0.1053 | ENERGY | 0.1947 | ENERGY |
| 0.0757 | CASH DEPOSIT | 0.1938 | WATER |
| 0.0693 | HOME COMMUNICATIONS | 0.0476 | ROAD TAX |
| | | 0.0421 | GROCERIES |

| Archetype 3 (Renter A) | | Archetype 4 (Traveler A) | |
|---|---|---|---|
| Probability | Word | Probability | Word |
| 0.3519 | RENT PAYMENT | 0.3353 | AIRLINES |
| 0.1683 | WATER | 0.2781 | TAXI |
| 0.1427 | ENERGY | 0.1116 | BUSES |
| 0.1280 | TV LICENSE | 0.1097 | TRAINS |
| 0.0342 | CHILDCARE | 0.0703 | CASH WITHDRAWAL |

| Archetype 5 (Driver A) | | Archetype 6 (Renter B) | |
|---|---|---|---|
| Probability | Word | Probability | Word |
| 0.3898 | ROAD TAX | 0.3508 | RENT PAYMENT |
| 0.3598 | FUEL | 0.1615 | TV LICENSE |
| 0.2272 | CAR PARKS | 0.1110 | GROCERIES |
| 0.0086 | TOLL ROADS | 0.0678 | BEAUTY |

TABLE 3-continued

| | 0.0066 | TRAINS | 0.0542 | ENERGY |
|---|---|---|---|---|

| Archetype 7 (Consumer A) | | Archetype 8 (Traveler B) | |
|---|---|---|---|
| Probability | Word | Probability | Word |
| 0.2747 | FUEL | 0.2845 | RESTAURANT AND CAFE |
| 0.1867 | ENERGY | | |
| 0.1866 | WATER | 0.2839 | CASH WITHDRAWAL |
| 0.1070 | CAR PARKS | 0.0864 | GROCERIES |
| 0.0516 | GROCERIES | 0.0590 | CHILDCARE |
| | | 0.0420 | BEAUTY |

| Archetype 9 (Home/Car Owner A) | | Archetype 10 (Car Owner/Traveler) | |
|---|---|---|---|
| Probability | Word | Probability | Word |
| 0.5770 | MORTGAGE PAYMENT | 0.4195 | AUTO LOAN PAYMENT |
| 0.1002 | CASH DEPOSIT | 0.4009 | FUEL |
| 0.0829 | FUEL | 0.1705 | CAR PARKS |
| 0.0783 | AUTO LOAN PAYMENT | 0.0032 | AIRLINES |
| | | 0.0026 | TAXI |
| 0.0715 | CASH WITHDRAWAL | | |

| Archetype 11 (Consumer B) | | Archetype 12 (Consumer C) | |
|---|---|---|---|
| Probability | Word | Probability | Word |
| 0.5747 | MECHANICS | 0.1775 | GROCERIES |
| 0.1916 | TOLL ROADS | 0.1256 | CHILDCARE |
| 0.0484 | PUBS AND BARS | 0.1083 | RETAIL |
| 0.0403 | PHARMACIES | 0.0977 | HEALTH INSURANCE |
| 0.0372 | RETAIL | 0.0961 | HEALTHCARE |

In Table 3 an informal descriptive name is shown in the top row, which attempts to capture the theme of the more probable words in the archetype—note again this is not hand designed but grouped words defined by the machine learning algorithm. For example, archetype 1 is described as the "Homeowner A", since the top 5 most probable words included "water" (i.e., water bill), "energy" (i.e., utility bill), and "home repair". While these descriptive names have no rigorous mathematical grounding, they can often be useful as a quick reference name for each archetype.

With the collaborative profiling model trained and using both the $\theta$'s and tag vectors, a supervised artificial neural network was trained for multi-class classification. One can compare the archetype embedding/distribution for a few different customers and their respective neural network outputs.

Table 4 shows the archetype distributions for 3 different customers. The first archetype distribution is for Customer X who has a mortgage account. The next shows the resulting archetype distribution for Customer X if they had omitted their mortgage account, referred to as Customer $\hat{X}$. While the probability of the Home/Car Owner A archetype decreases when the mortgage account is omitted, other words such as home repair maintain a higher than usual probability for Homeowner A archetype. The third archetype distribution is for Customer Y, a renter with an auto loan, but no mortgage, and the probability for the Homeowner A or Home/Car Owner A archetype is quite small.

TABLE 4

| ARCHETYPE | Customer X Probability | Customer $\hat{X}$ Probability | Customer Y Probability |
|---|---|---|---|
| Homeowner A | 0.4423 | 0.6293 | 0.0017 |
| Car Owner A | 0.1174 | 0.1211 | 0.204 |
| Renter A | 0.003 | 0.0033 | 0.202 |

TABLE 4-continued

| ARCHETYPE | Customer X Probability | Customer $\hat{X}$ Probability | Customer Y Probability |
|---|---|---|---|
| Traveller A | 0.0033 | 0.0047 | 0.0013 |
| Driver A | 0.0441 | 0.0617 | 0.0078 |
| Renter B | 0.0016 | 0.0017 | 0.1461 |
| Consumer A | 0.0584 | 0.0594 | 0.1666 |
| Traveller B | 0.0259 | 0.0374 | 0.0011 |
| Home/Car Owner A | 0.254 | 0.0025 | 0.0009 |
| Car Owner/Traveller | 0.007 | 0.038 | 0.0395 |
| Consumer B | 0.0353 | 0.0344 | 0.0171 |
| Consumer C | 0.0077 | 0.0066 | 0.212 |

As shown, the first is Customer X who has no selective omissions. The second is for Customer $\hat{X}$, who via counterfactual intervention had selective omission of the mortgage account. The third archetype Customer Y belongs to a renter with no mortgage account. Comparing the archetype probabilities across each customer, we can see that Customer X's Homeowner A archetype is similar to Customer $\hat{X}$'s even though Customer $\hat{X}$ omitted the mortgage account. This implies that even with the removal of mortgage account words from Customer X's document, other words in the document still had a high value of mutual information or correspondence with having a mortgage account.

Particularly, looking at Customer X's word counts in Table 1, one can see that there were occurrences of "home repair", "energy", and "water", which are all probable words for the Homeowner A archetype. The renter's archetype distribution shows almost zero probability assigned to both the Homeowner A archetype and the Home/Car Owner A archetype, which is consistent given the renter had no mortgage account or home omitted or otherwise.

The above subtle relations are captured and capitalized upon in the pursuit of detecting selective omission, using one or more embodiments disclosed herein. Furthermore, training a neural network using these archetype distributions as inputs allows for the above patterns to be detected and efficiently leveraged in estimating the probability of selective omission.

Table 5 below shows the resulting neural network estimated probabilities of omission for Customer X, Customer $\hat{X}$, and Customer Y. Customer X and Customer Y exhibit low probabilities of omission across all tradeline categories. Customer $\hat{X}$ shows low probabilities of omission for all categories, except for mortgage omission where the probability is close to 1 as desired.

TABLE 5

| | NNET Omission Probability Estimates | | |
|---|---|---|---|
| | Customer X | Customer $\hat{X}$ | Customer Y |
| Auto Loan Omission | 6.6E−08 | 8.3E−08 | 5.5E−06 |
| Debit Account Omission | 5.2E−09 | 2.7E−05 | 4.6E−08 |
| Mortgage Omission | 8.5E−07 | 9.9E−01 | 3.8E−07 |
| Revolving Account | 3.6E−06 | 1.3E−06 | 4.5E−03 |

Figure 6:
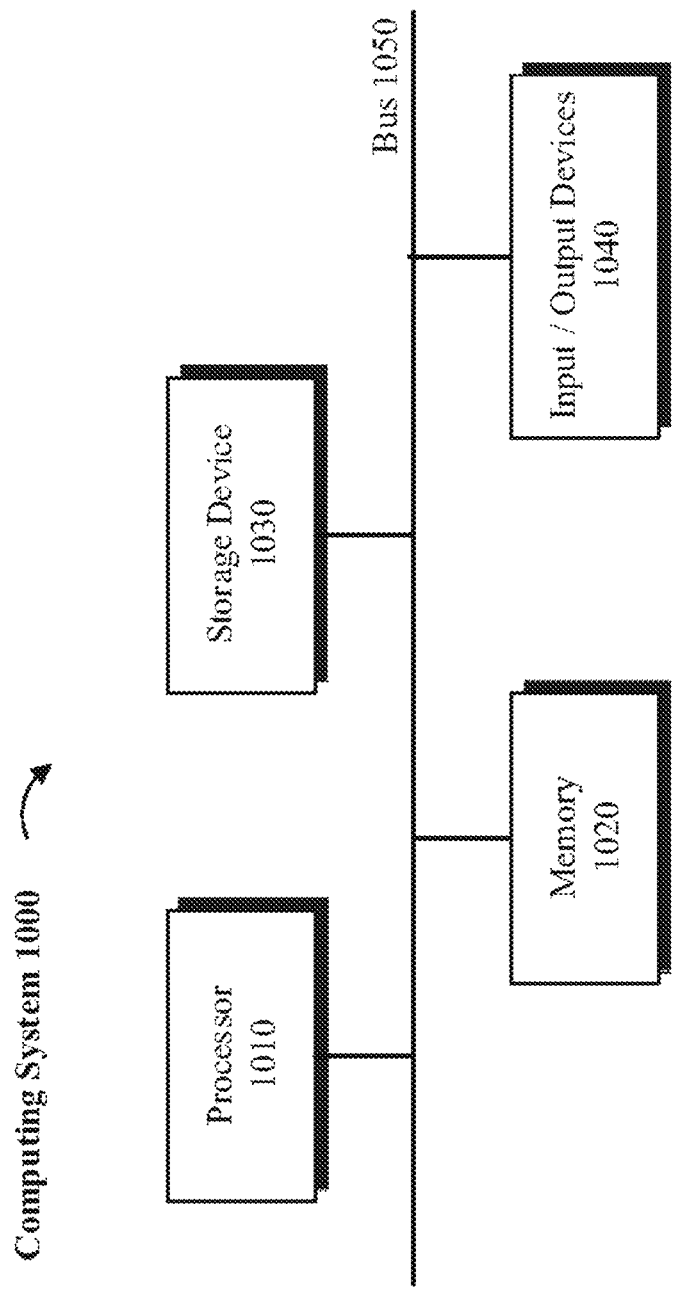
FIG. 6 is a block diagram of an example computing system that may be utilized to perform one or more computing operations or processes as consistent with one or more disclosed features.

Referring to FIG. 6, a block diagram illustrating a computing system 1000 consistent with one or more embodiments is provided. The computing system 1000 may be used to implement or support one or more platforms, infrastructures or computing devices or computing components that may be utilized, in example embodiments, to instantiate, implement, execute or embody the methodologies or processes disclosed herein in a computing environment using, for example, one or more processors or controllers, as provided below.

As shown in FIG. 6, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, a cloud platform. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal.

The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

A portion of the disclosure of this patent document may contain material, which is subject to copyright protection. The applicant has no objection to the reproduction of the patent documents or the patent disclosure as it appears in the Patent and Trademark Office patent files or records, but reserves all copyrights whatsoever. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

The invention claimed is:

1. A computer-implemented method for detection of selective omissions in an open data sharing computing platform, the method comprising:
    monitoring a plurality of electronically detectible events associated with a first digital record stored in a database of digital records, the first digital record uniquely identifying a first entity;
    associating a first detected event with a first set of words at least partially descriptive of the first detected event, the first set of words being recorded in one or more electronic records in at least one non-transitory data storage medium;
    associating a second detected event with a second set of words at least partially descriptive of the second detected event, the second set of words being recorded in one or more electronic records in the at least one non-transitory data storage medium,
        the first event and the second event being detected, in response to digital records associated with the first event and the second event being shared over a communications network implemented using an open data sharing computing platform with express authorization provided by the first entity;
    establishing a digital association between a first digital document assigned to the first entity and a third set of words, the third set of words being recorded in one or more electronic records in the at least one non-transitory data storage medium and being a union of the first set of words and the second set of words and implemented by way of creating a digital set of unordered records from a combination of the words in the first set of words and the second set of words;
    determining the first entity's multinomial distribution over a plurality of archetypes, wherein a probability of the first entity belonging to each archetype from among the plurality of archetypes is calculated based on the words included in the digital set of unordered records; and
    training a model to detect that the first entity has omitted to report a first account, in response to determining that the first entity belongs to a distribution of archetype probabilities and that an account type associated with the distribution of archetype probabilities is likely not included in a list of accounts or events shared by the first entity over the open data sharing computing platform.

2. The method of claim 1, wherein the first entity is compared with other entities generated through a counterfactual intervention of entities with omitted account or tradeline events in an archetype space to detect likelihood of selective omissions by the first entity.

3. The method of claim 1, wherein the first entity is compared with other entities generated through a counterfactual intervention of entities with omitted account or tradeline events in an archetype space and use of a trained supervised model on actual and generated through a counterfactual intervention of entities with omitted account or tradeline events to determine the probability of the type of accounts omitted by the first entity.

4. The method of claim 1, wherein the first entity is an individual submitting a credit application and the individual is associated with a primary score, indicating the individual's credit worthiness, and a supplemental score is generated based on the likelihood of selective omissions by the individual participating in an open data sharing environment and identification of type of omitted data.

5. The method of claim 1, wherein an omission is deemed probable as related to the first entity, in response to determining that the first entity belongs to a distribution of archetype probabilities and that an account type associated with the distribution of archetype probabilities is likely not included in a list of accounts or events shared by the first entity over the open data sharing computing platform.

6. The method of claim 1, wherein a subsequent event is associated with subsequent words of at least partially descriptive subsequent event a new digital association is established between the first digital document assigned to the first entity and a union of subsequent set of words with a prior history of word events, and
    wherein the multinomial distribution of the plurality of archetypes is denoted by a vector $\theta \in [0,1]^m$, where m denotes number of the plurality of archetypes, and where a $j^{th}$ entry, $\theta_j$, represents the probability of the $j^{th}$ archetype for the first entity.

7. The method of claim 6, wherein a matrix $\phi \in [0,1]^{n \times m}$ is defined by the relation, $\phi_{ij} = P_j(w_i)$, indicating that a digital record referenced by the $i^{th}$ row and $j^{th}$ column in the matrix represents the probability of word i under the distribution corresponding to archetype j.

8. The method of claim 7, wherein the first entity is associated with a distribution over words in the digital set of unordered records, and wherein the distribution is used to determine a probability of a given word being associated with the first entity and an archetype mixture as denoted by $P_\theta(w_i) = \Sigma_j \phi_{ij} \theta_j$.

9. The method of claim 8, wherein a digital collaborative profile for the first entity is generated to store the values of $\theta$, and the collaborative profile is updated, in response to detecting an event associated with a first digital record.

10. The method of claim 9, wherein based on the collaborative profile, the first entity is embedded as an m-dimensional vector in archetype space, $\theta \in \mathbb{R}^m$.

11. A computer-implemented system for detection of selective omissions in an open data sharing computing platform, the system comprising one or more processors for performing one or operations the operations comprising:
    monitoring a plurality of electronically detectible events associated with a first digital record stored in a database of digital records, the first digital record uniquely identifying a first entity;

associating a first detected event with a first set of words at least partially descriptive of the first detected event, the first set of words being recorded in one or more electronic records in at least one non-transitory data storage medium;

associating a second detected event with a second set of words at least partially descriptive of the second detected event, the second set of words being recorded in one or more electronic records in the at least one non-transitory data storage medium, the first event and the second event being detected, in response to digital records associated with the first event and the second event being shared over a communications network implemented using an open data sharing computing platform with express authorization provided by the first entity;

establishing a digital association between a first digital document assigned to the first entity and a third set of words, the third set of words being a union of the first set of words and the second set of words and implemented by way of creating a digital set of unordered records from a combination of the words in the first set of words and the second set of words;

determining the first entity's multinomial distribution over a plurality of archetypes, wherein a probability of the first entity belonging to each archetype from among the plurality of archetypes is calculated based on the words included in the digital set of unordered records; and training a model to detect that the first entity has omitted to report a first account, in response to determining that the first entity belongs to a distribution of archetype probabilities and that an account type associated with the distribution of archetype probabilities is likely not included in a list of accounts or events shared by the first entity over the open data sharing computing platform.

12. The system of claim 11, wherein an omission is deemed probable as related to the first entity, in response to determining that the first entity belongs to a distribution of archetype probabilities and that an account type associated with the distribution of archetype probabilities is likely not included in a list of accounts or events shared by the first entity over the open data sharing computing platform.

13. The system of claim 11, wherein a subsequent event is associated with subsequent words of at least partially descriptive subsequent event a new digital association is established between the first digital document assigned to the first entity and a union of subsequent set of words with a prior history of word events, and wherein the multinomial distribution of the plurality of archetypes is denoted by a vector $\theta \in [0,1]^m$, where m denotes number of the plurality of archetypes, and where a $j^{th}$ entry, $\theta_j$, represents the probability of the $j^{th}$ archetype for the first entity, wherein a matrix $\phi \in [0,1]^{n \times m}$ is defined by the relation, $\phi_{ij} = P_j(w_i)$, indicating that a digital record referenced by the $i^{th}$ row and $j^{th}$ column in the matrix represents the probability of word i under the distribution corresponding to archetype j, wherein the first entity is associated with a distribution over words in the digital set of unordered records, and wherein the distribution is used to determine a probability of a given word being associated with the first entity and an archetype mixture as denoted by $P_\theta(w_i) = \Sigma_j \phi_{ij} \theta_j$, and wherein a digital collaborative profile for the first entity is generated to store the values of $\theta$, and the collaborative profile is updated, in response to detecting an event associated with a first digital record.

14. The system of claim 13, wherein based on the collaborative profile, the first entity is embedded as an m-dimensional vector in archetype space, $\theta \in \mathbb{R}^m$, wherein the first entity is compared with other entities generated through a counterfactual intervention of entities with omitted account or tradeline events in the archetype space to detect likelihood of selective omissions by the first entity, and wherein the first entity is compared with other entities generated through a counterfactual intervention of entities with omitted account or tradeline events in the archetype space and use of a trained supervised model on actual and generated through a counterfactual intervention of entities with omitted account or tradeline events to determine the probability of the type of accounts omitted by the first entity.

15. The system of claim 14, wherein the first entity is an individual submitting a credit application and the individual is associated with a primary score, indicating the individual's credit worthiness, and a supplemental score generated based on the likelihood of selective omissions by the individual participating in the open data sharing environment and identification of type of omitted data.

16. A computer program product comprising a non-transitory machine-readable medium storing instructions that, when executed by at least one programmable processor, cause the at least one programmable processor to perform operations comprising:

monitoring a plurality of electronically detectible events associated with a first digital record stored in a database of digital records, the first digital record uniquely identifying a first entity;

associating a first detected event with a first set of words at least partially descriptive of the first detected event, the first set of words being recorded in one or more electronic records in at least one non-transitory data storage medium;

associating a second detected event with a second set of words at least partially descriptive of the second detected event, the second set of words being recorded in one or more electronic records in the at least one non-transitory data storage medium, the first event and the second event being detected, in response to digital records associated with the first event and the second event being shared over a communications network implemented using an open data sharing computing platform with express authorization provided by the first entity;

establishing a digital association between a first digital document assigned to the first entity and a third set of words being recorded in one or more electronic records in the at least one non-transitory data storage medium and the third set of words being a union of the first set of words and the second set of words and implemented by way of creating a digital set of unordered records from a combination of the words in the first set of words and the second set of words;

determining the first entity's multinomial distribution over a plurality of archetypes, wherein a probability of the first entity belonging to each archetype from among the plurality of archetypes is calculated based on the words included in the digital set of unordered records; and training a model to detect that the first entity has omitted to report a first account, in response to determining that the first entity belongs to a distribution of archetype probabilities and that an account type associated with the distribution of archetype probabilities is likely not included in a list of accounts or events shared by the first entity over the open data sharing computing platform.

17. The computer program product of claim 16, wherein the first entity is compared with other entities generated through a counterfactual intervention of entities with omitted account or tradeline events in an archetype space to detect likelihood of selective omissions by the first entity.

18. The computer program product of claim 16, wherein the first entity is compared with other entities generated through a counterfactual intervention of entities with omitted account or tradeline events in an archetype space and use of a trained supervised model on actual and generated through a counterfactual intervention of entities with omitted account or tradeline events to determine the probability of the type of accounts omitted by the first entity.

19. The computer program product of claim 16, wherein the first entity is an individual submitting a credit application and the individual is associated with a primary score, indicating the individual's credit worthiness, and a supplemental score generated based on the likelihood of selective omissions by the individual participating in an open data sharing environment and identification of type of omitted data.

20. The computer program product of claim 16, wherein an omission is deemed probable as related to the first entity, in response to determining that the first entity belongs to a distribution of archetype probabilities and that an account type associated with the distribution of archetype probabilities is likely not included in a list of accounts or events shared by the first entity over the open data sharing computing platform, wherein a subsequent event is associated with subsequent words of at least partially descriptive subsequent event a new digital association is established between the first digital document assigned to the first entity and a union of subsequent set of words with a prior history of word events, wherein the multinomial distribution of the plurality of archetypes is denoted by a vector $\theta \in [0,1]^m$, where m denotes number of the plurality of archetypes, and where a $j^{th}$ entry, $\theta_j$, represents the probability of the $j^{th}$ archetype for the first entity, wherein a matrix $\phi \in [0,1]^{n \times m}$ is defined by the relation, $\phi_{ij} = P_j(w_i)$, indicating that a digital record referenced by the $i^{th}$ row and $j^{th}$ column in the matrix represents the probability of word i under the distribution corresponding to archetype j, wherein the first entity is associated with a distribution over words in the digital set of unordered records, and wherein the distribution is used to determine a probability of a given word being associated with the first entity and an archetype mixture as denoted by $P_\theta(w_i) = \Sigma_j \phi_{ij} \theta_j$, and wherein a digital collaborative profile for the first entity is generated to store the values of $\theta$, and the collaborative profile is updated, in response to detecting an event associated with a first digital record.

\* \* \* \* \*